(12) United States Patent
Priser et al.

(10) Patent No.: US 11,008,834 B2
(45) Date of Patent: May 18, 2021

(54) INTEGRATED DRILLING RIG MACHINE

(71) Applicant: SCHLUMBERGER TECHNOLOGY CORPORATION, Sugar Land, TX (US)

(72) Inventors: Jean-Christophe Priser, Katy, TX (US); Jacques Orban, Houston, TX (US); Nick Krippner, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/610,176

(22) PCT Filed: May 1, 2018

(86) PCT No.: PCT/US2018/030331
§ 371 (c)(1),
(2) Date: Nov. 1, 2019

(87) PCT Pub. No.: WO2018/204293
PCT Pub. Date: Nov. 8, 2018

(65) Prior Publication Data
US 2020/0115996 A1    Apr. 16, 2020

Related U.S. Application Data

(60) Provisional application No. 62/492,366, filed on May 1, 2017.

(51) Int. Cl.
*E21B 41/00* (2006.01)
*F04B 17/03* (2006.01)
*H02M 5/458* (2006.01)
*H02P 27/06* (2006.01)

(52) U.S. Cl.
CPC .......... *E21B 41/0085* (2013.01); *F04B 17/03* (2013.01); *H02M 5/4585* (2013.01); *H02P 27/06* (2013.01)

(58) Field of Classification Search
CPC .................................................. E21B 41/0085
See application file for complete search history.

(56) References Cited

U.S. PATENT DOCUMENTS

| | | |
|---|---|---|
| 2008/0283300 A1 | 11/2008 | Jones |
| 2009/0195074 A1 | 8/2009 | Buiel |
| 2011/0074165 A1 | 3/2011 | Grimes et al. |
| 2012/0049625 A1 | 3/2012 | Hopwood |
| 2012/0292992 A1 | 11/2012 | Williams |

(Continued)

FOREIGN PATENT DOCUMENTS

| | | |
|---|---|---|
| CN | 203515545 | 9/2015 |
| EP | 2698498 A1 | 2/2014 |

(Continued)

*Primary Examiner* — Kristyn A Hall

(57) ABSTRACT

An integrated drilling rig machine is disclosed. An integrated power and electronics unit (IPEU) includes all components necessary to transmit power from a generator to rig machines such as a mud pump, drawworks, top drive, etc. A housing contains a rectifier, a transformer, inverter(s), and starter motors. The inverters are coupled to rig machines and the starter motors are coupled to auxiliary devices such as cooling fans, lubrication pumps, communication systems, etc. A controller controls operation of the IPEU according to instructions received from a remote device.

29 Claims, 10 Drawing Sheets

(56) References Cited

U.S. PATENT DOCUMENTS

2013/0056279 A1  3/2013  Osara et al.
2015/0233213 A1  8/2015  Hu et al.
2015/0252661 A1  9/2015  Glass

FOREIGN PATENT DOCUMENTS

WO  2004097162 A1  11/2004
WO  2011159420 A2  12/2011

INTEGRATED DRILLING RIG MACHINE

CROSS-REFERENCE TO RELATED APPLICATIONS

This application claims priority to and the benefit of U.S. Provisional Application No. 62/492,366, titled "Integrated Drilling Rig Machine," filed May 1, 2017, the entire disclosure of which is hereby incorporated herein by reference.

BACKGROUND

On an alternating current (AC) drilling rig, an AC generator set generates the electrical power used to operate the heavy rig equipment, such as the top drive, the mud pump, and the drawworks. The AC generator set includes an AC generator powered by a diesel engine or other prime mover. The resulting AC current is utilized by a variable-frequency drive (VFD) associated with the rig equipment component, such that the top drive, mud pump, and drawworks may each have a dedicated VFD.

The VFDs may be installed in an access-controlled room, known as a power house, a power-control room (PCR), a local electronics room (LER), and the like. While the VFDs are primarily utilized to power the main rig machines (the top drive, the mud pump, and the drawworks), smaller motors installed on or otherwise associated with the main machines (and/or perhaps other "non-main" rig equipment) may be also operated from the power house, such as cooling fans, centrifugal pumps (such as for feeding the mud pump), lubrication systems, and other examples.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

SUMMARY

Figure 1:
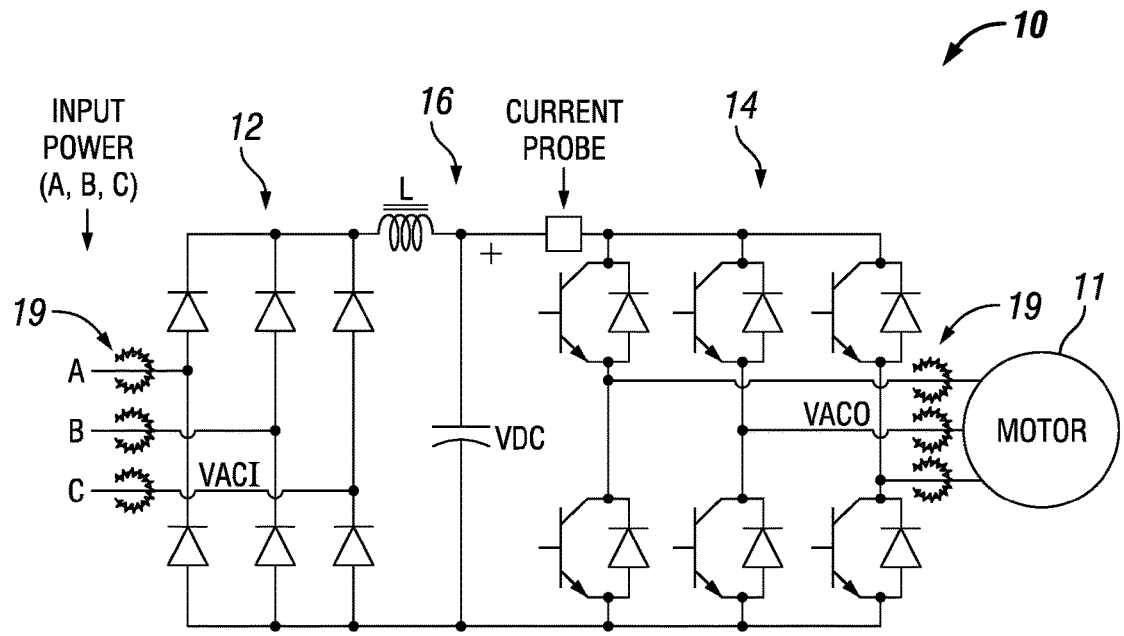
FIG. 1 is a schematic view of at least a portion of apparatus according to one or more aspects of the present disclosure.

Embodiments of the present disclosure are directed to an integrated power and electronics unit (IPEU) that includes a housing having a power input configured to receive input power from a generator. The housing has several outputs. The IPEU also includes a programmable logic controller (PLC) within the housing configured to communicate with an external module and to thereby receive control instructions, a rectifier within the housing configured to receive power from the generator via the power input, and a transformer within the housing configured to receive and transform the power. There are also a plurality of starters within the housing that are able to receive power from the transformer. The starters are able to provide power to individual auxiliary units. The IPEU also includes a plurality of inverters within the housing that are able to receive power from the rectifier, each inverter being coupled to a rig machine to deliver power and control to the rig machines via the outputs. The IPEU may also include a cooling system mounted to the housing and configured to dissipate heat from the housing, the cooling system can receive power and controls from one or more of the inverters. In some embodiments IPEU configured to transmit at least 20,000 Watts of electric power.

Further embodiments of the present disclosure are directed to an integrated power and controls unit (IPEU) that includes an input power module configured to receive power from a generator, a rectifier configured to receive power via the input power module, and a plurality of inverters operably coupled to the rectifier and configured to receive power from the rectifier. Each inverter is configured to convey power to a rig machine, the rig machine being coupled to the IPEU. The IPEU also includes a transformer configured to receive power via the input power module, and a plurality of starters operably coupled to the transformer and configured to receive power from the transformer. The starters are configured to convey power to one or more auxiliary devices. The IPEU can also include a controller operably coupled to the rectifier, the inverters, the transformer, and the starters. The controller is configured to receive instructions from a remote device by which to control the rectifier, the inverters, the transformer, and the starters. The IPEU has a housing covering the rectifier, the inverters, the transformer, and the starters integrated together in the housing, and a cooling system coupled to the housing and configured to dissipate heat from the housing.

Still further embodiments of the present disclosure are directed to a method including providing a housing configured to integrally house a controller, a rectifier, a transformer, a plurality of inverters, and a plurality of starters, the inverters being configured to transmit power and control to one or more rig machines, and the starters being configured to start a plurality of auxiliary devices. The method also includes communicating with the controller to operate the rectifier, transformer, inverters, and starters, and operating the rig machines and the auxiliary devices via the controller. In some embodiments the method also includes receiving data from a plurality of sensors and transmitting the data to the controller.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Figure 2:
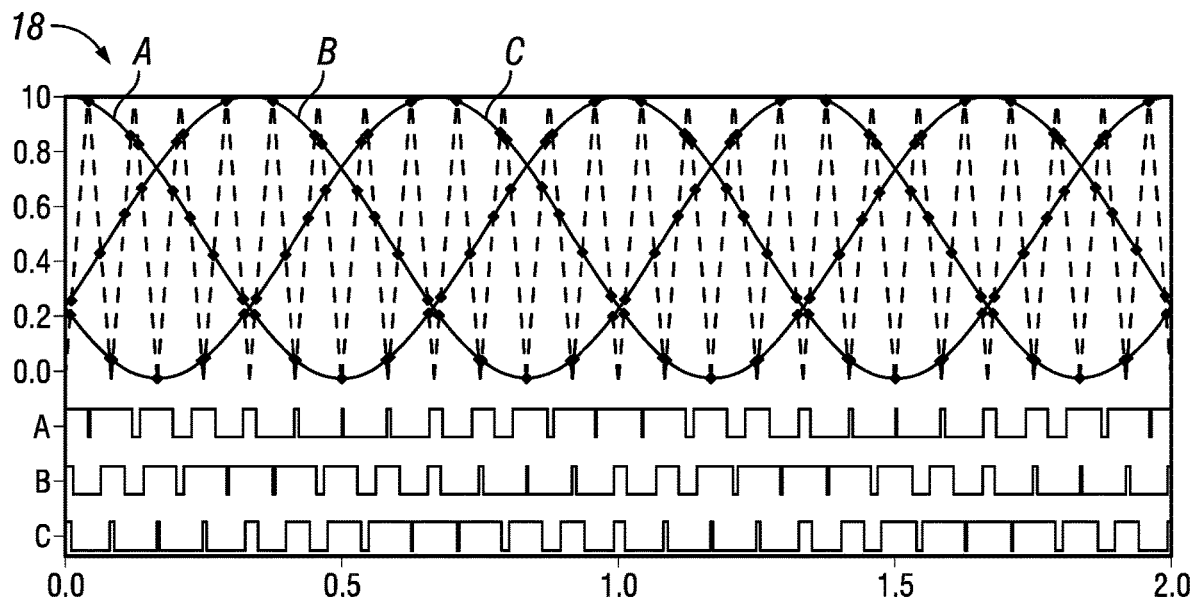
FIG. 2 is a graph depicting one or more aspects of the present disclosure.

FIG. 1 is a schematic view of an example implementation of a VFD 10 for driving an induction motor 11 within the scope of the present disclosure. The VFD 10 includes a rectifier circuit 12 that rectifies the input power VacI, an inverter circuit 14 that produces the output VacO to drive the motor 11, and a filter circuit 16 between the rectifier and inverter circuits, such as to reduce the noise generated by the inverter circuit 14. FIG. 2 depicts an example pulse-width modulation 18 that may be used to provide the three-phase output VacO at a certain frequency to drive the motor at a target speed. FIG. 1 also depicts current probes 19 at each input and output conductor, as well as between the filter and inverter circuits, as examples of sensors that may be utilized to monitor and perhaps provide feedback (automatic or manual) for operation of the motor 11.

The present disclosure introduces an integrated power and electronics unit (IPEU) integrated in a drilling rig machine skid, such as a mud pump skid, a drawworks skid, and others. The IPEU alone delivers the electrical and control support for the equipment on that skid. For example, the IPEU includes a VFD for the main motor of the primary machine of the skid (e.g., mud pump, drawworks, top drive, etc.), a controller, and a networking interface. The IPEU may also include a VFD and starter(s) for one or more motors of secondary machines/functions, such as cooling blowers, centrifugal pumps, lubricating pumps, and other examples. The IPEU may also include means for data acquisition, such as from sensors associated with equipment on the skid, from equipment not integrated in the skid (such as the main controller of the drilling rig via the networking interface), and/or from mobile electronic devices (e.g., tablet computers, smartphones, laptop computers, etc.) proximate the IPEU. The IPEU may also include emergency stop means for abruptly halting operation of one or more components of the skid.

The IPEU receives electrical power from a power source at the wellsite via a power cable. Information exchanged between the IPEU and equipment not integrated in the skid (both to and from the IPEU) may be via a cable and/or wireless communication. The IPEU may also share information for coordination between multiple machines on the skid, such as in implementations in which the mud pump system includes multiple pumps that, via the information sharing, operate out of phase with respect to each other so as to reduce vibration.

The IPEU and the main motor of the skid (including the related electronics for power and control) may be a single, integrated component, such as may be sold or marketed as a single product, in contrast to an assembly of separately marketed components. The IPEU and the main motor(s) may also be an integral component of a fully integrated skid. The integrated IPEU/motor/electronics product may be operable to perform for a predefined period of time with no (or very limited) maintenance. Moreover, the electronics and perhaps other portions of the integrated product may not be accessible by the end user, such that installation of the integrated product by the end user may be limited to connecting and disconnecting the power and communication cables, until integrated product reaches the end of its operational life and is replaced by a new or refurbished (OEM) unit.

Figure 3:
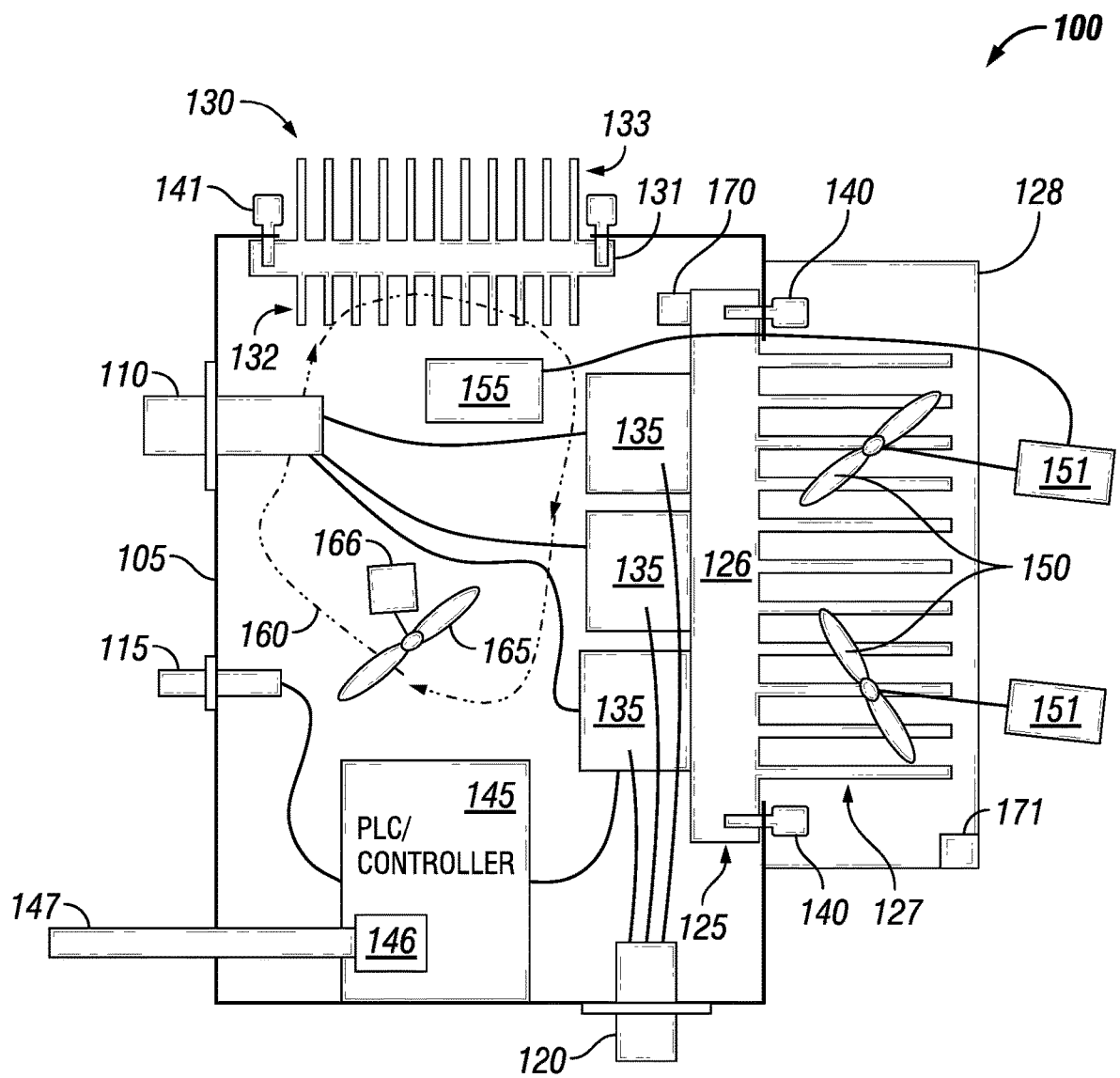
FIG. 3 is a schematic view of at least a portion of apparatus according to one or more aspects of the present disclosure.

FIG. 3 is a schematic view of at least a portion of an example implementation of an IPEU 100 according to one or more aspects of the present disclosure. The IPEU 100 includes a housing (e.g., a rectangular metal box) 105 having openings through which extends an input power bulkhead connector 110, one or more communication bulkhead connectors 115, an output power bulkhead connector 120, a primary radiator 125, and perhaps a secondary radiator 130. The housing 105 may have an access door (not shown) for assembly/maintenance purposes.

The VFD is implemented via three insulated-gate bipolar transistor (IGBT) devices 135, although another number of IGBT devices 135 may be used. The IGBT devices 135 are secured to a plate 126 of the primary radiator 125 in a manner permitting heat transfer (via conduction and/or otherwise) from the IGBTs 135 to the primary radiator 125. The plate 126 is secured in to the housing 105 via bolts and/or other attachment means 140. The primary radiator 125 also includes fins and/or other elongated radiating members 127 extending from the plate 126 (opposite the IGBTs 135) exterior to the housing 105.

The IPEU 100 also includes a controller 145, which may be or comprise the programmable logic controller operable to control the IGBTs 135. However, the controller 145 may also be operable to control other components of the IPEU 100, and perhaps components of the skid in addition to the IPEU. The controller 145 may include a communications interface 146 permitting communication between the controller 145 and other components of the IPEU 100. The communications interface 146 may also permit communication between the controller 145 and components not included in the IPEU 100, such as other components on the skid that includes the IPEU 100, and perhaps other components not located on the skid. Such communication, whether internal to the IPEU 100, internal to the skid comprising the IPEU 100, or external to the skid, may be via wired connection and/or via wireless communication (e.g., via antenna/receiver 147).

The IPEU 100 may also include one or more fans 150 operable to increase airflow across the radiating members 127. In the example implementation depicted in FIG. 3, the airflow is perpendicular to the page. Ducting 128 attached to the housing 105 may also be included to focus airflow across the radiating members 127. The fans 150 may include electric motors 151 energized by a secondary VFD 155 also contained within the housing 105. Control of the fans 150 may be via the secondary VFD 155 and/or the controller 145.

The primary radiator 125 (and perhaps the fans 150) may be configured to sufficiently manage the heat generated by the IGBTs 135. However, the controller 145, the secondary VFD 155, and/or other internal components of the IPEU 100 may generate additional heat. Thus, the IPEU 100 may also include the secondary radiator 130 and/or a secondary fan 165 (although two or more of the secondary radiator 130 and/or the secondary fan 165 may be included). A plate 131 of the secondary radiator 130 is secured in to the housing 105 via bolts and/or other attachment means 141. The secondary radiator 130 includes internal fins and/or other elongated members 132 extending internally from the plate 131, and external fins and/or other elongated radiating members 133 extending externally from the plate 131 (opposite the internal members 132) exterior to the housing 105. The fan 165 is operable to increase airflow 160 across the internal elongated members 132 of the secondary radiator 130. The fan 165 may include an electric motor 166 energized by the secondary VFD 155. Control of the fan 165 may be via the secondary VFD 155 and/or the controller 145.

The IPEU 100 may also include various sensors operable for detecting of temperature, pressure, humidity, airflow, and/or other parameters of the IPEU 100. In the example implementation depicted in FIG. 3, such sensors include a temperature sensor 170 for detecting the temperature of the plate 126 and a temperature sensor 171 for detecting the temperature of the airflow in the ducting 128. In some embodiments the airflow through the ducting 128 can also be measured to be sure that proper airflow is occurring in order to properly cool. Other sensors may also be included, including sensors that generate signals indicative of the sensed parameters. The controller 145 may also be operable to receive the signals (via wired or wireless connections) for use in operation of the IGBTs 135, the fans 150, the fan 165, and/or other components, for example.

In contrast to prior art equipment for use on a drill rig, in which each component is built and installed separately and modularly, the systems and methods of the present disclosure provide a single unit IPEU 100 which contains everything needed to operate the drill and as many auxiliary services as are desired. With input power 110 and communication to the controller 145, the IPEU 100 is capable of 40,000 hours of operation without need for intervention or additional materials.

Figure 4:
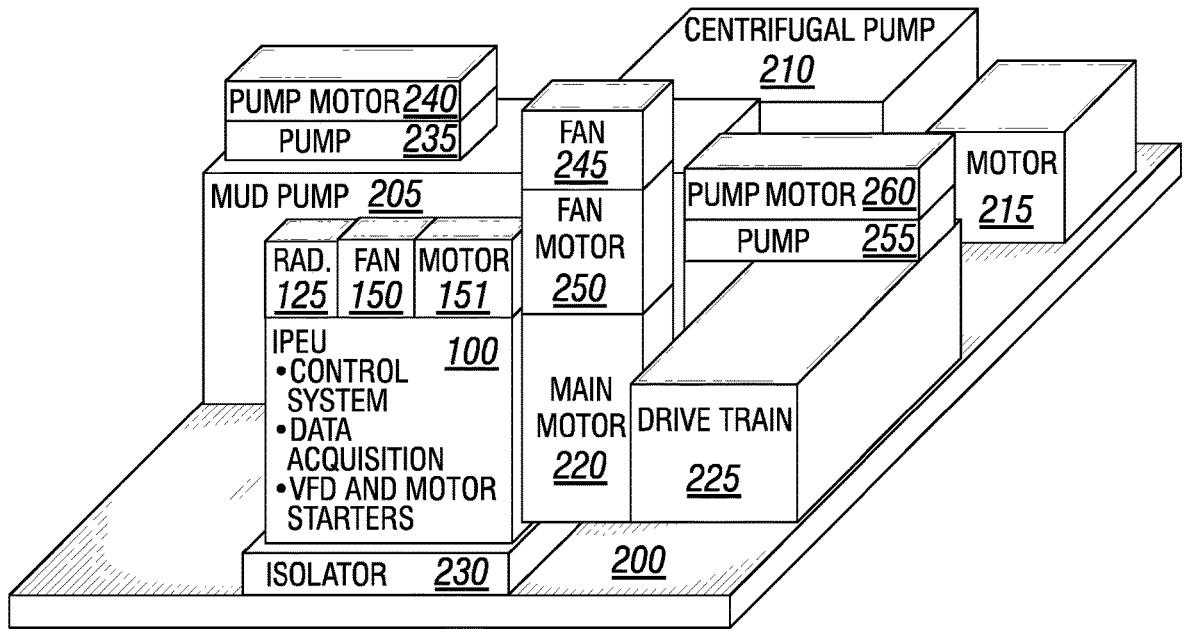
FIG. 4 is a schematic view of at least a portion of apparatus according to one or more aspects of the present disclosure.
Figure 5:
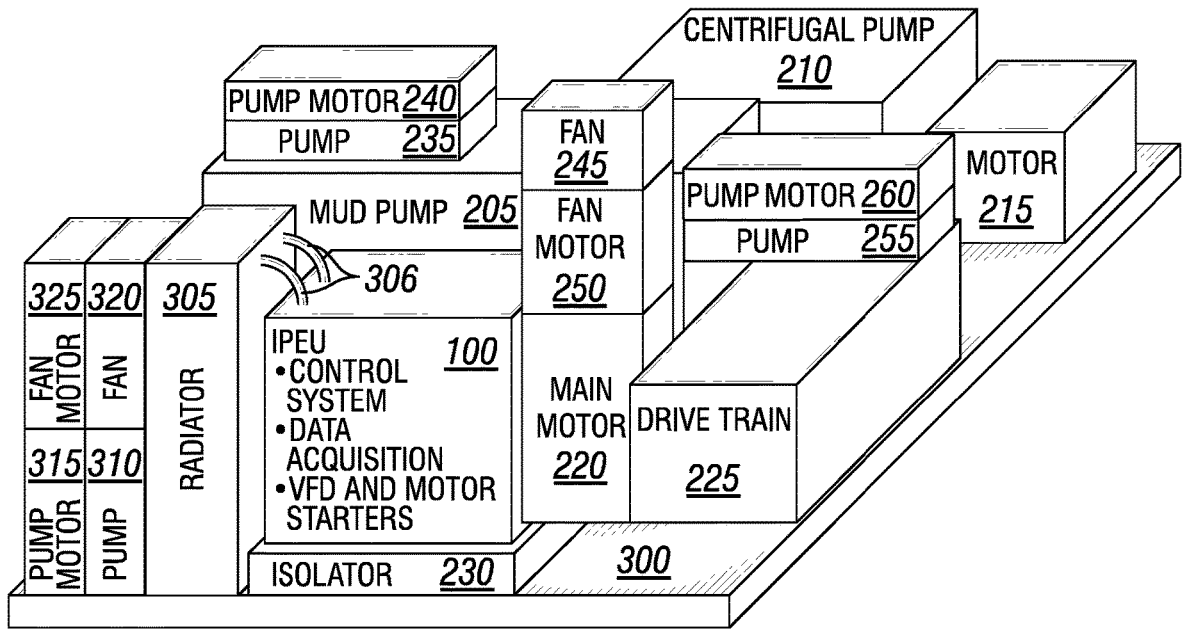
FIG. 5 is a schematic view of at least a portion of apparatus according to one or more aspects of the present disclosure.
Figure 6:
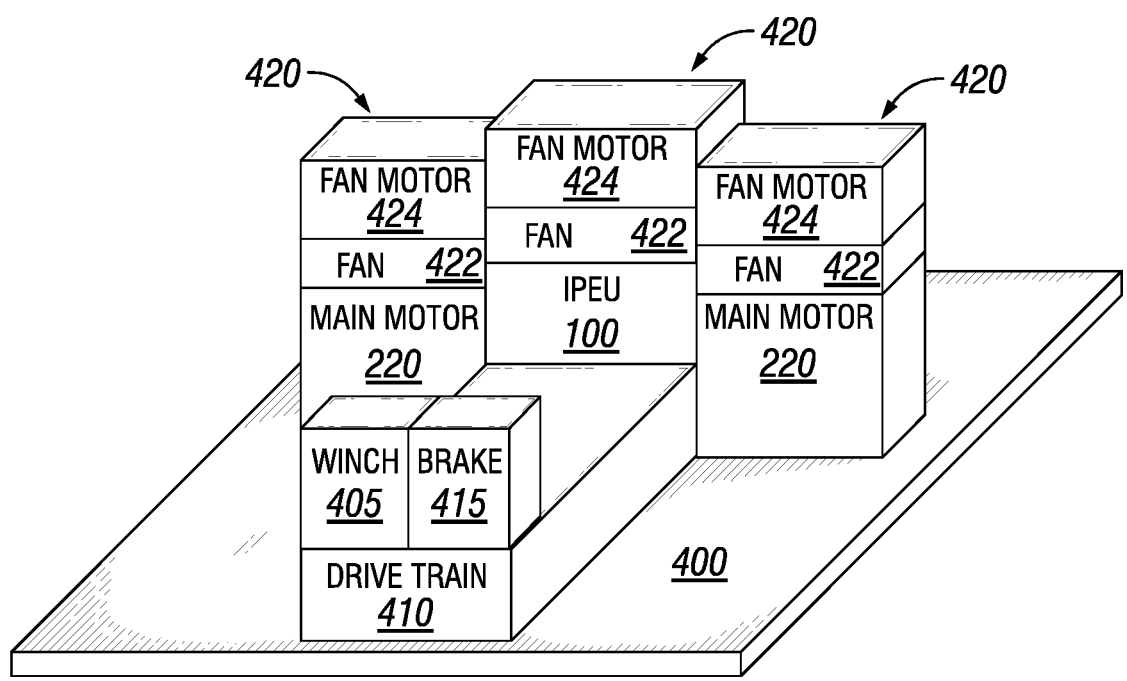
FIG. 6 is a schematic view of at least a portion of apparatus according to one or more aspects of the present disclosure.

FIG. 4 is a schematic view of at least a portion of an example implementation of a skid 200 according to one or more aspects of the present disclosure. Although the example skid 200 depicted in FIG. 4 is a mud pump skid, a person having ordinary skill in the art will readily recognize that the aspects described herein are also applicable or readily adaptable to a drawworks skid and other wellsite equipment. It is to be appreciated that the relative size of the components in FIGS. 4-6 is not necessarily representative of the actual size of the components. In some embodiments the various components have different horsepower ratings which may or may not be reflected in their size as shown in FIGS. 4-6. For example, a main motor 220 can be rated up to 1600 hp, a pump motor 240 may be 10 hp, a fan motor 250 may be 40 hp, a motor 215 may be 100 hp, etc. The systems and methods of the present disclosure are not limited to the size or shape of the components shown in FIGS. 4-6 and in fact virtually any size or power rating can be used within the scope of the present disclosure.

The skid 200 includes a mud pump 205 attached to the skid. The mud pump 205 may be or comprise triplex pumps and/or other types of pumps. A centrifugal pump 210 driven by a motor 215 operates in conjunction with the mud pump 205. A main motor 220 drives the mud pump 205 via a belt system, a chain system, and/or other drive train 225. The motor 220 may be a large induction motor, such as having a power rating between about 400 HP and about 2500 HP, and/or otherwise operable to sufficiently drive the mud pump 205. In other implementations, the motor 220, perhaps still within the 400-2500 HP range, is operable to sufficiently drive a drawworks, a top drive, or other high-power rig equipment. As described above, the VFD of the IPEU 100 drives the motor 220, and the primary radiator 125 and the fans 150 manage heat generated during operation of the IPEU 100.

The skid 200 also includes an isolator 230 to decrease vibration of the skid 200 (e.g., resulting from vibration of the mud pump 205) transmitted to the IPEU 100. For example, the isolator 230 may comprise rubber or other compliant materials, springs, and/or other vibration damping means.

The mud pump 205 includes a lubrication system comprising an oil pump 235 driven by a motor 240. The lubrication system may include a cooling system comprising a fan 245 driven by a motor 250. The mud pump 205 may also include a piston cleaning system comprising a water pump 255 driven by a motor 260. Electrical power and control of the centrifugal pump motor 215, the oil pump motor 240, the cooling fan motor 250, and/or the water pump motor 260 may be via the IPEU 100. Such control may be via wired and/or wireless communication.

FIG. 5 is a schematic view of an example implementation of a skid 300 in which the IPEU 100 is liquid-cooled, instead of the air-cooled arrangement depicted in the example implementation shown in FIG. 4. Except for the different cooling means, the example skids 200 and 300 depicted in FIGS. 4 and 5 may be substantially similar or the same. Implementations within the scope of the present disclosure may include those in which the IPEU 100 is air-cooled as depicted in FIG. 4, liquid-cooled as depicted in FIG. 5, or both.

The liquid-cooling system of the skid 300 includes a radiator 305 having internal coolant (e.g., water) conduits in fluid communication with internal coolant conduits of the IPEU 100, such as via external conduits 306. Coolant is circulated between the radiator 305 and the IPEU 100 (through the conduits 206) by a pump 310 driven by a motor 315, such that the coolant flowing through the IPEU 100 can be cooled in the radiator 205 and returned to the IPEU 100. The liquid-cooling system may also comprise a fan 320 driven by a motor 325 to increase the cooling capacity of the radiator 305. Electrical power and control of the pump motor 315 and/or the fan motor 325 may be via the IPEU 100. Such control may be via wired and/or wireless communication.

The IPEU 100 may control each of the motors 151, 215, 220, 240, 250, 260, 315, and 325 (among other possible motors included in the skid) for start/stop operation, as well as speed control where applicable. Various sensors (not shown) may be associated with one or more of the motors. For example, a pressure gauge associated with the lubrication system of the mud pump 205 may be utilized to verify the lubrication pump is delivering the correct pressure. If the lubrication pressure is not adequate, the integrated control system implemented by the IPEU 100 may prohibit operation of the main motor 220. Similar motor activation and control of the result of the motor activation may be implemented for the cooling system, whether for the air-cooled system depicted in FIG. 4, the liquid-cooled system depicted in FIG. 5, or combinations thereof. For example, information obtained via a temperature sensor installed in one or more locations may be utilized by the IPEU 100 to control the result of the intended cooling effect. Various additional examples exist for how the IPEU 100 may control certain components of the skid based on information sensed from other components of the skid, as well as information obtained elsewhere.

FIG. 6 is a schematic view of at least a portion of an example implementation of a drawworks skid 400 according to one or more aspects of the present disclosure. For the skid 400, the main motor 220 described above drives a drawworks winch 405 instead of mud pumps 205 as described above. Two or more of the main motors 220 may be operably arranged to drive the winch 405 via a drive train 410, such as may comprise a belt system, a chain system, and/or other means for transferring rotary motion of the main motor(s) 220 to the winch 405. The IPEU 100 provides power and control of the main motor(s) 220, as described above, and may also power and/or control a brake 415 operable to slow or halt rotation of the winch 405. The skid 400 may also include one or more cooling systems 420, each of which may be similar to the air-cooling system depicted in FIG. 4 and/or the liquid-cooling system depicted in FIG. 5. The cooling systems 420 can include a fan 422 and a fan motor 424 and can be air or liquid-based. The cooling systems 420 may be for cooling the IPEU 100, the main motor(s) 220, the brake 415, and/or other components of the skid 400.

As described above, the "integrated system" introduced in the present disclosure includes an internal control system to manage each of the auxiliary functions utilized for the efficient and safe operation of a mud pump 205 or drawworks winch 405. The same applies to other implementations in which the main motor 220 and the IPEU 100 are at least partially integrated with a top drive and/or other main rig components. With such implementation, the rig control system may not be burdened with performing "local" decisions specific to a given mud pump skid, drawworks skid, top drive system, and/or other main rig machine. Instead, the rig control system may manage just the factors linked to the drilling rig and the drilling process as a whole. Consequently, even if a different machine is installed on the rig, the rig control system can just determine the drilling parameters and not deal with the local parameters of a specific machine.

The control system of the integrated skid may contain all the required parameters and logic to coordinate all the axillary functions of the integrated skid in accordance to the desired operation related to the drilling rig, as specified by the central computer of the drilling rig. For example, the control system of the integrated skid may hold calibration parameters of all sensors associated with the main and auxiliary machines of the skid. The control system may also hold other operational, maintenance (e.g., replacement parts and schedules), usage, and other information related to the main and auxiliary machines of the skid.

The integrated skid may have simple connection to the rig system, such as a single power cable (e.g., 600 V, 4160V, or even DC) to feed power to the skid, and perhaps a control cable and/or wireless communication means to permit control of the skid equipment by the central computer of the rig. For example, the mud pumps, drawworks, top drive, and other primary machines contemplated by the present disclosure are large and high-powered, and consequently have an "emergency stop" function. The "emergency stop" button may be located in the driller's control room (DCR) or a primary power/control room (PCR) of the rig. Thus, dedicated wired or wireless communication can be used between the "emergency stop" button and the control function of the integrated skid to ensure the "stop" of the skid equipment when urgency mandates.

As described above, wireless control of the skid equipment may be utilized instead of or in addition to control via cabling. For implementations utilizing wireless control, digital exchanges normally performed via the control cable are performed via radio or other wireless protocol link to and from the central computer of the rig. The wireless communication can also support the reception of a dedicated signal from the "emergency-stop" button. Such wireless "E-stop" may entail continuous transmission from the "E-stop" button system to the IPEU on the integrated skid. This can be specific analog signals or a continuous transmission of a coded signal. For reliability of the system, a simple decoder may avoid confusion in software.

The example implementations described above may also include means for absorbing excess electrical power. For example, the IPEU 100 may manage electrical operation of the drawworks brake 415 in a manner such that electrical energy supplied to the winch 405, or even electrical energy generated by the winch 405, is either consumed or safely dissipated (such as within a resistor of the brake 415). Mud pumps are also able to regenerate power. For example, in high-speed, low-pressure operations, electrical energy can be generated if the mud pump is stopped suddenly or a relief valve suddenly opens. Scenarios also exist for top drives to regenerate power. Thus, in each of these implementations, the IPEU 100 may be configured to safely absorb and utilize or otherwise safely dissipate these unexpected power events. Electrical braking is present when operating a drawworks, because a fair amount of electrical energy may be generated during sudden deceleration, and also when lowering the hook, which may support a substantial mass. Related aspects are described below in reference to FIGS. 11 and 12, for example.

Figure 7:
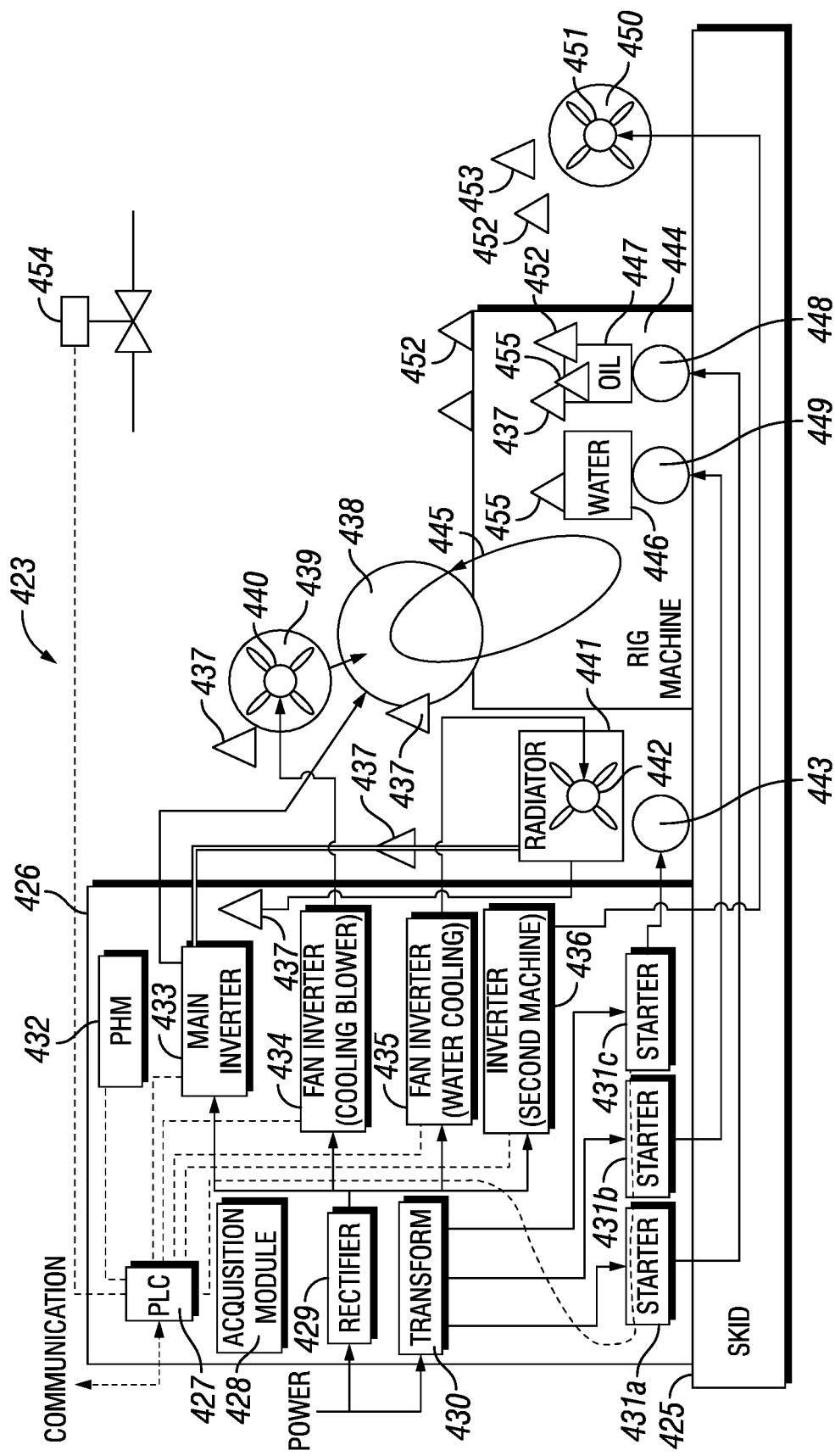
FIG. 7 is a schematic view of at least a portion of apparatus according to one or more aspects of the present disclosure.

FIG. 7 is a schematic view of at least a portion of an example implementation of an integrated rig machine 423 according to one or more aspects of the present disclosure. Although, the implementation in FIG. 7 is for a mud pump skid, such as the skids 200 and 300 shown in FIGS. 4 and 5, a person having ordinary skill in the art will recognize that the following description is also applicable or readily adaptable for implementations with other machines within the scope of the present disclosure, such as via adaptation of the sensors and perhaps some external actuators, where appropriate.

The machine in FIG. 7 includes a main motor 438 and auxiliary motors 443, 449, 448, 440, 442, and 451, as well as rectifiers and inverters to drive the motors, as described above. The machine 423 includes an IPEU 426 which houses the PLC 427, an acquisition module 428, a rectifier 429, a transformer 430 which is coupled to one or more starters 431a, 431b, and 431c. The IPEU 426 also includes a plurality of inverters 433, 434, 435, and 436 which are configured to operate the main motor (inverter 433), fans (inverters 434 and 435), and any other suitable auxiliary device (inverter 436). The number of inverters and the machines/devices to which they provide power can vary for a given installation, as can the number and type of starters 431. The IPEU 426 can be designed to fit the needs of a particular application and once constructed can be delivered to the drill site and installed with a few connections and can be up and running in a comparatively short time period and, due to the ease of operation, can be operable over an extremely long lifecycle.

The main inverter 433 can be coupled to the main motor 438 which is coupled to a rig machine 444 via a transmission 445, such as a belt or another suitable mechanical equivalent. The fan inverter 434 can be coupled to a cooling blower 439 which has a motor 440 and a temperature sensor 437. The cooling blower can also be coupled to the PLC 427. The cooling blower 439 can be coupled to the main motor 438 and configured to cool the motor 438 and can be controlled via the PLC 427. Another fan inverter 435 can be coupled to a liquid cooling system 441 having a motor 442 and a pump 443 and perhaps some other components. The fan inverter 435 can provide the electrical power needed by these systems. Another inverter 436 can be used to power a secondary machine, which can be any machine such as a centrifugal pump or another suitable component. Virtually any other component or auxiliary system can be run from the IPEU 426 via an appropriately designed inverter which can also be integrated into the IPEU 426 to provide the power needs for the drilling system.

Multiple sensors are monitored by the PLC/controller 427 via an acquisition module 428. The controller 427 also controls cooling of the power electronic and motors. A transformer 430 permits creating lower AC voltage to power smaller machine components. Multiple starters 431a, 431b, 431c (potentially smart starters) are operable to start various small auxiliary functions of the machines, such as lubrication, cleanup, and other functions. The example implementation of FIG. 7 also includes the capability to operate one or more local actuators 454 mounted on the integrated machine.

The PLC 427 receives, from the main rig computer (not shown), the key settings for the main functions of the machine 423, such as flow rate for a triplex or other mud pump system, lifting speed for a drawworks system, or rotary speed for a top drive system, among other examples. Additional drive parameters may also be sent to the fully integrated machine 423. The PLC 427 then ensures that most (or all) local settings and controls of the machine are made in accord with the main settings. For example, the PLC 427 may ensure that (1) the temperature of the motor 438 and electronics is maintained within predetermined ranges via control of the cooling system 441, (2) the lubrication system 447 is delivering lubrication at a pressure, flow rate, and temperature (for example) within predetermined ranges, and (3) the mud pump feed valve and other machine actuators are in the proper setting.

The fully integrated machine 423 may also perform more advanced control. For example, the rig central computer may send a request to downlink to downhole tools (MWD, LWD, etc.) via flow variation. The rig computer may even send the digital frame to downlink. The PLC 427 may then ensure the downlink by varying the flow as required, and after the downlink is completed, the PLC 427 may confirm the end of the task to the rig computer.

The many different components being integrated together as shown in FIG. 7 allows an ease of operation and installation that has been unavailable until now. Previous attempts at building drilling rigs have included integrating a motor and a variable frequency drive; however, no commercial offering or endeavor has attempted to integrate a controller, rectifier, transformer, inverters, and starters into a single package. The system is vastly easier and simpler to operate and maintain than conventional systems in which each component must be sourced, purchased, shipped, and installed on the rig.

In some applications, rig machines 444 are driven in tight coordination. For example, triplex pumps may be run with the crankshaft properly aligned in angle to reduce pressure variation within the discharge pipe as measured by pressure sensor 452. For implementations in which the machine 444 is skid-implemented with two main motors 438 (such as for drawworks, some top drive systems, and some triplex pumping systems), it may be mandatory that one motor operates as a slave of the other motor. To achieve such objectives, the controller in each integrated machine 423 may have its main clock properly synchronized over a reference clock (such as the clock of the main rig computer, or even a GPS clock reference). In such case, the rig computer may transmit the general operation goal for reach machine. Thus, the machine may continue to accurately perform the intended function. Although the 460 main computer may periodically supervise the operation of the machine 423 and subcomponents 462, 463, and 464 (such as to verify that the triplex crankshafts are still operating with proper angular alignment), the main computer may be configured to monitor the clock of a single machine (the master) and the other machines are configured to locally communicate with the master machine and sync with the master (the slaves). This configuration permits more time and resource-efficient communication between the main computer 460 and ensures better coordination between the rig machines 462, 463, and 464.

Figure 8:
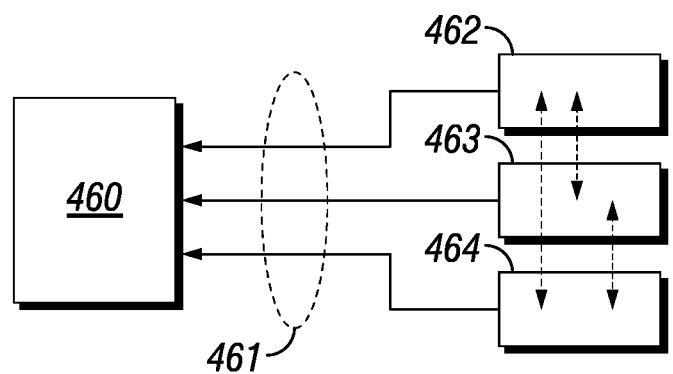
FIG. 8 is a schematic view of at least a portion of apparatus according to one or more aspects of the present disclosure.

Controllers of the integrated machines 423 (e.g., of three triplex pumps integrated on a skid 425) may also jointly perform jointly a function. In such implementations, the machine-specific controllers may have a specific local link to exchange information for this coordination, instead of or in addition to their communication links with the integrated controller/PLC. As depicted in FIG. 8, such exchange may be via a digital local network 461 and/or other means for directly exchanging the critical information (such as measured instantaneous angular position of the crankshafts). This direct exchange may also permit sharing the output of critical sensors such as pressure sensors 452, level sensors 455, and temperature sensors 437 (FIG. 7).

When multiple machines or motors of one machine are intended to work in a coordinated way, one integrated motor may be defined as the leader (or master), and the other one may be defined as a follower (or slave). The rig control system may perform this assignment, or such assignment may be performed manually.

Figure 9:
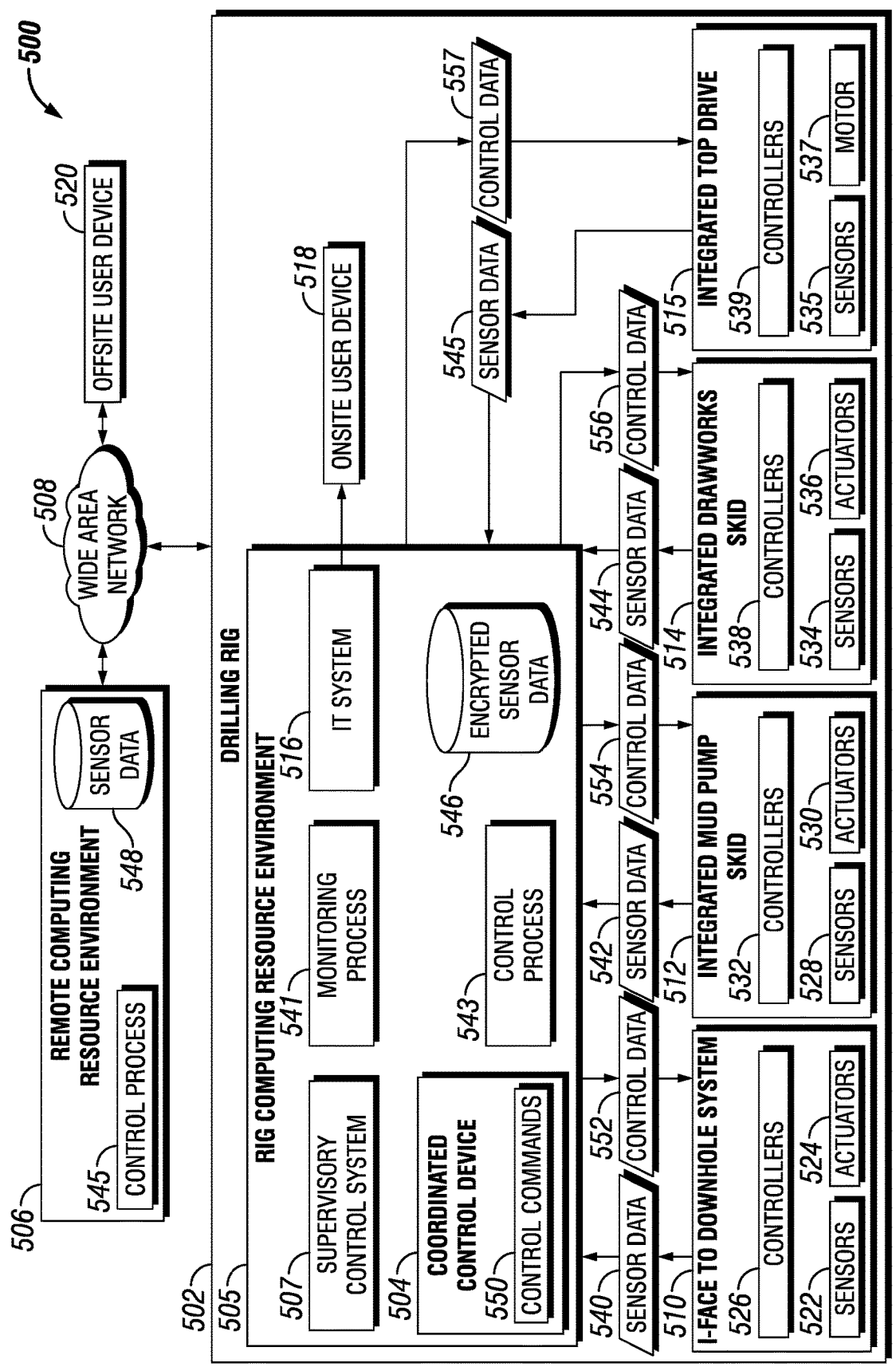
FIG. 9 is a schematic view of at least a portion of apparatus according to one or more aspects of the present disclosure.

FIG. 9 shows an example implementation of a rig system 500 according to one or more aspects of the present disclosure. The rig system 500 includes a rig computing resource environment 505 (an example implementation of the "rig computer" described herein) and the systems linked to the rig computing resource environment 505, including an integrated mud pump skid 512, an integrated drawworks skid 514, and an integrated top drive system 515. Each system 512, 514, 515 may individually be integrated according to one or more aspects described above, and the systems 512, 514, 515 and others may be collectively integrated or otherwise interconnected as depicted in FIG. 9.

The rig computing resource environment 505 may communicate with offsite devices and systems using a network 508 (e.g., a wide area network (WAN), such as the internet). The rig computing resource environment 505 may also communicate with a remote computing resource environment 506 via the network 508.

FIG. 9 also depicts example systems of the drilling rig 502, such as an interface to a downhole system 510, the integrated mud pump skid 512, the integrated drawworks skid 514, the integrated top drive system 515, and an IT system 516. One or more onsite user devices 518 may also be included on the drilling rig 502. The onsite user devices 518 may interact with the IT system 516. The onsite user devices 518 may include various user devices, such as stationary user devices intended to be stationed at the drilling rig 502 and/or portable user devices. The onsite user devices 518 may include a desktop, a laptop, a smartphone, a personal data assistant (PDA), a tablet component, a wearable computer, or other suitable devices. The onsite user devices 518 may communicate with the rig computing resource environment 505, the remote computing resource environment 506, or both.

One or more offsite user devices 520 may also be included in the system 500. The offsite user devices 520 may include a desktop, a laptop, a smartphone, a personal data assistant (PDA), a tablet component, a wearable computer, or other suitable devices. The offsite user devices 520 may be configured to receive and/or transmit information (e.g., monitoring functionality) from and/or to the drilling rig 502 via communication with the rig computing resource environment 505. The offsite user devices 520 may provide control processes for controlling operation of the various systems of the drilling rig 502. The offsite user devices 520 may communicate with the remote computing resource environment 506 via the network 508.

The user devices 518 and/or 520 may be examples of a human-machine interface. These devices 518, 520 may allow feedback from the various rig subsystems to be displayed and allow commands to be entered by the user. Such human-machine interfaces may be onsite or offsite, or both.

The systems of the drilling rig 502 may include various sensors, motors, and controllers (e.g., PLCs), including those described above, which may provide feedback for use in the rig computing resource environment 505. The integrated mud pump skid 512 may include sensors 528, actuators 530, and controllers 532. Additionally, the integrated drawworks skid 514 may include sensors 534, actuators 536, and controllers 538. Further, the integrated top drive system 515 can include sensors 535, motor 537, and controller 539. The interface to downhole system 510 permits information exchange with the downhole system 560, which also includes sensors 564, actuator 566, and downhole controller 562. The downhole controller 562 communicates to an uphole controller 526 via wireless telemetry. This permits the interface to downhole system 510 to access the sensors 564 and the actuators 566 of the downhole system 560. The sensors 528, 534, 535, and 564 may include various sensors for operation of the drilling rig 502 and drilling operations. The sensors 528, 534, 535, and 564 may include a camera, a speed sensor (measuring, e.g., revolutions per second), a torque sensor (e.g., of motor 537), a pressure sensor, a temperature sensor, a flow rate sensor, a vibration sensor, a current sensor, a voltage sensor, a resistance sensor, a gesture detection sensor or device, a voice actuated or recognition device or sensor, or other sensors.

The sensors described above may provide sensor data feedback to the rig computing resource environment 505 (e.g., to the coordinated control device 504). For example, downhole system sensors 564 may provide sensor data 540, the fluid system sensors 528 may provide sensor data 542, the top drive sensors 535 may provide sensor data 545, and the central system sensors 554 may provide sensor data 544. The sensor data 540, 542, 544, and 545 may include, for example, equipment operation status (e.g., on or off, up or down, set or release, etc.), drilling parameters (e.g., depth, hook load, torque, etc.), auxiliary parameters (e.g., vibration data of a pump), and other data. The acquired sensor data may include or be associated with a timestamp (e.g., a date, time, or both) indicating when the sensor data was acquired. The sensor data may be aligned with a depth and/or other drilling parameter.

Acquiring the sensor data into the coordinated control device 504 may facilitate measurement of the same physical properties at different locations of the drilling rig 502 and the downhole system 560. Measurement of the same physical properties may be used for measurement redundancy to enable continued operation of the well. Measurements of the same physical properties at different locations may be used for detecting equipment conditions among different physical locations. Measurements of the same physical properties using different sensors may provide information about the relative quality of each measurement, resulting in a "higher" quality measurement being used for rig control, and process applications. The variation in measurements at different locations over time may be used to determine equipment performance, system performance, scheduled maintenance due dates, and the like. Aggregating sensor data from each subsystem into a centralized environment may enhance drilling process and efficiency. For example, slip status (e.g., in or out) may be acquired from the sensors and provided to the rig computing resource environment 505, which may be used to define a rig state for automated control. In another example, acquisition of fluid samples may be measured by a sensor and related with bit depth and time measured by other sensors. Acquisition of data from a camera sensor may facilitate detection of arrival and/or installation of materials or equipment in the drilling rig 502. The time of arrival and/or installation of materials or equipment may be used to evaluate degradation of a material, scheduled maintenance of equipment, and other evaluations.

The coordinated control device 504 may facilitate control of individual systems (e.g., the integrated drawworks skid 514, the downhole system 560, or the integrated mud pump skid 512, etc.) at the level of each individual system. For example, in the integrated mud pump skid 512, sensor data 528 may be fed into the controller 532, which may respond to control the actuators 530. However, for control operations that involve multiple systems, the control may be coordinated through the coordinated control device 504. Examples of such coordinated control operations include the control of downhole pressure during tripping. The downhole pressure may be affected by both the integrated mud pump skid 512 (e.g., pump rate and choke position) and the integrated drawworks skid 514 (e.g., tripping speed). When it is intended to maintain certain downhole pressure during tripping, the coordinated control device 504 may be used to direct the appropriate control commands. Furthermore, for mode based controllers which employ complex computation to reach a control set point, which are typically not implemented in the subsystem PLC controllers due to complexity and high computing power demands, the coordinated control device 504 may provide the adequate computing environment for implementing these controllers.

Control of the various systems of the drilling rig 502 may be provided via a multi-tier (e.g., three-tier) control system that includes a first tier of the controllers 526, 532, 538, and 539, a second tier of the coordinated control device 504, and a third tier of the supervisory control (e.g., supervisory control system 507). The first tier of the controllers may be responsible for safety critical control operation, or fast loop feedback control. The second tier of the controllers may be responsible for coordinated controls of multiple equipment or subsystems, and/or responsible for complex model based controllers. The third tier of the controllers may be responsible for high level task planning, such as to command the rig system to maintain certain bottom hole pressure. In other implementations, coordinated control may be provided by one or more controllers of one or more of the drilling rig systems 510, 512, 514, and 515 without the use of a coordinated control device 504. In such implementations, the rig computing resource environment 505 may provide control processes directly to these controllers for coordinated control. For example, the controllers 526 and 552 may be used for coordinated control of multiple systems of the drilling rig 502.

The sensor data 540, 542, 544, and 545 may be received by the coordinated control device 504 and used for control of the drilling rig 502 and the drilling rig systems 510, 512, 514, and 515. The sensor data 540, 542, 544, and 545 may be encrypted to produce encrypted sensor data 546. For example, the rig computing resource environment 505 may encrypt sensor data from different types of sensors and systems to produce a set of encrypted sensor data 546. Thus, the encrypted sensor data 546 may not be viewable by unauthorized user devices (either offsite or onsite user device) if such devices gain access to one or more networks of the drilling rig 502. The sensor data 540, 542, 544, and 545 may include a timestamp and an aligned drilling parameter (e.g., depth) as described above. The encrypted sensor data 546 may be sent to the remote computing resource environment 506 via the network 508 and stored as encrypted sensor data 548.

The rig computing resource environment 505 may provide the encrypted sensor data 548 available for viewing and processing offsite, such as via offsite user devices 520. Access to the encrypted sensor data 548 may be restricted via access control implemented in the rig computing resource environment 505. The encrypted sensor data 548 may be provided in real-time to offsite user devices 520 such that offsite personnel may view real-time status of the drilling rig 502 and provide feedback based on the real-time sensor data. For example, different portions of the encrypted sensor data 546 may be sent to offsite user devices 520. Encrypted sensor data may be decrypted by the rig computing resource environment 505 before transmission or decrypted on an offsite user device after encrypted sensor data is received.

The offsite user device 520 may include a client (e.g., a thin client) configured to display data received from the rig computing resource environment 505 and/or the remote computing resource environment 506. For example, multiple types of thin clients (e.g., devices with display capability and minimal processing capability) may be used for certain functions or for viewing various sensor data.

The rig computing resource environment 505 may include various computing resources used for monitoring and controlling operations such as one or more computers having a processor and a memory. For example, the coordinated control device 504 may include a computer having a processor and memory for processing sensor data, storing sensor data, and issuing control commands responsive to sensor data. As noted above, the coordinated control device 504 may control various operations of the various systems of the drilling rig 502 via analysis of sensor data from one or more drilling rig systems (e.g., 510, 512, 514, and 515) to enable coordinated control between each system of the drilling rig 502. The coordinated control device 504 may execute control commands 550 for control of the various systems of the drilling rig 502 (e.g., drilling rig systems 510, 512, 514, and 515). The coordinated control device 504 may send control data determined by the execution of the control commands 550 to one or more systems of the drilling rig 502. For example, control data 552 may be sent to the downhole system 510, control data 554 may be sent to the integrated mud pump skid 512, control data 557 may be sent to the integrated top drive system 515, and control data 556 may be sent to the integrated drawworks skid 514. The control data may include, for example, operator commands (e.g., turn on or off a pump, switch on or off a valve, update a physical property set point, etc.). The coordinated control device 504 may include a fast control loop that directly obtains sensor data 540, 542, 544, and 545 may and executes, for example, a control algorithm. The coordinated control device 504 may include a slow control loop that obtains data via the rig computing resource environment 505 to generate control commands.

The coordinated control device 504 may intermediate between the supervisory control system 507 and the controllers 526, 532, 538, and 539 of the systems 510, 512, 514, and 515. For example, in such implementations, a supervisory control system 507 may be used to control systems of the drilling rig 502. The supervisory control system 507 may include, for example, devices for entering control commands to perform operations of systems of the drilling rig 502. In some implementations, the coordinated control device 504 may receive commands from the supervisory control system 507, process the commands according to a rule (e.g., an algorithm based upon the laws of physics for drilling operations), and/or control processes received from the rig computing resource environment 505, and provide control data to one or more systems of the drilling rig 502. The supervisory control system 507 may be provided by and/or controlled by a third party. In such implementations, the coordinated control device 504 may coordinate control between discrete supervisory control systems and the systems 510, 512, 514, and 515 while using control commands that may be improved from the sensor data received from the systems 510, 512, 514, and 515 and analyzed via the rig computing resource environment 505.

The rig computing resource environment 505 may include a monitoring process 541 that may use sensor data to determine information about the drilling rig 502. For example, the monitoring process 541 may determine a drilling state, equipment health, system health, a maintenance schedule, or a combination thereof. Furthermore, the monitoring process 541 may monitor sensor data and determine the quality of one or a plurality of sensor data. The rig computing resource environment 505 may include control processes 543 that may use the sensor data 546 to improve drilling operations, such as, for example, the control of drilling equipment to improve drilling efficiency, equipment reliability, and the like. For example, the acquired sensor data may be used to derive a noise cancellation scheme to improve electromagnetic and mud pulse telemetry signal processing. The control processes 543 may be implemented via, for example, a control algorithm, a computer program, firmware, or other suitable hardware and/or software. The remote computing resource environment 506 may include a control process 545 that may be provided to the rig computing resource environment 505.

The rig computing resource environment 505 may include various computing resources, such as, for example, a single computer or multiple computers. The rig computing resource environment 505 may include a virtual computer system and a virtual database or other virtual structure for collected data. The virtual computer system and virtual database may include one or more resource interfaces (e.g., web interfaces) that permit the submission of application programming interface (API) calls to the various resources through a request. In addition, each of the resources may include one or more resource interfaces that permit the resources to access each other (e.g., to enable a virtual computer system of the computing resource environment to store data in or retrieve data from the database or other structure for collected data).

The virtual computer system may include a collection of computing resources configured to instantiate virtual machine instances. The virtual computing system and/or computers may provide a human-machine interface through which a user may interface with the virtual computer system via the offsite user device or the onsite user device. Other computer systems or computer system services may be utilized in the rig computing resource environment 505, such as a computer system or computer system service that provisions computing resources on dedicated or shared computers/servers and/or other physical devices. The rig computing resource environment 505 may include a single server (in a discrete hardware component or as a virtual server) or multiple servers (e.g., web servers, application servers, or other servers). The servers may be, for example, computers arranged in any physical and/or virtual configuration.

The rig computing resource environment 505 may include a database that may be a collection of computing resources that run one or more data collections. Such data collections may be operated and managed by utilizing API calls. The data collections, such as sensor data, may be made available to other resources in the rig computing resource environment or to user devices (e.g., onsite user device 518 and/or offsite user device 520) accessing the rig computing resource environment 505. The remote computing resource environment 506 may include similar computing resources to those described above, such as a single computer or multiple computers (in discrete hardware components or virtual computer systems).

Figure 10:
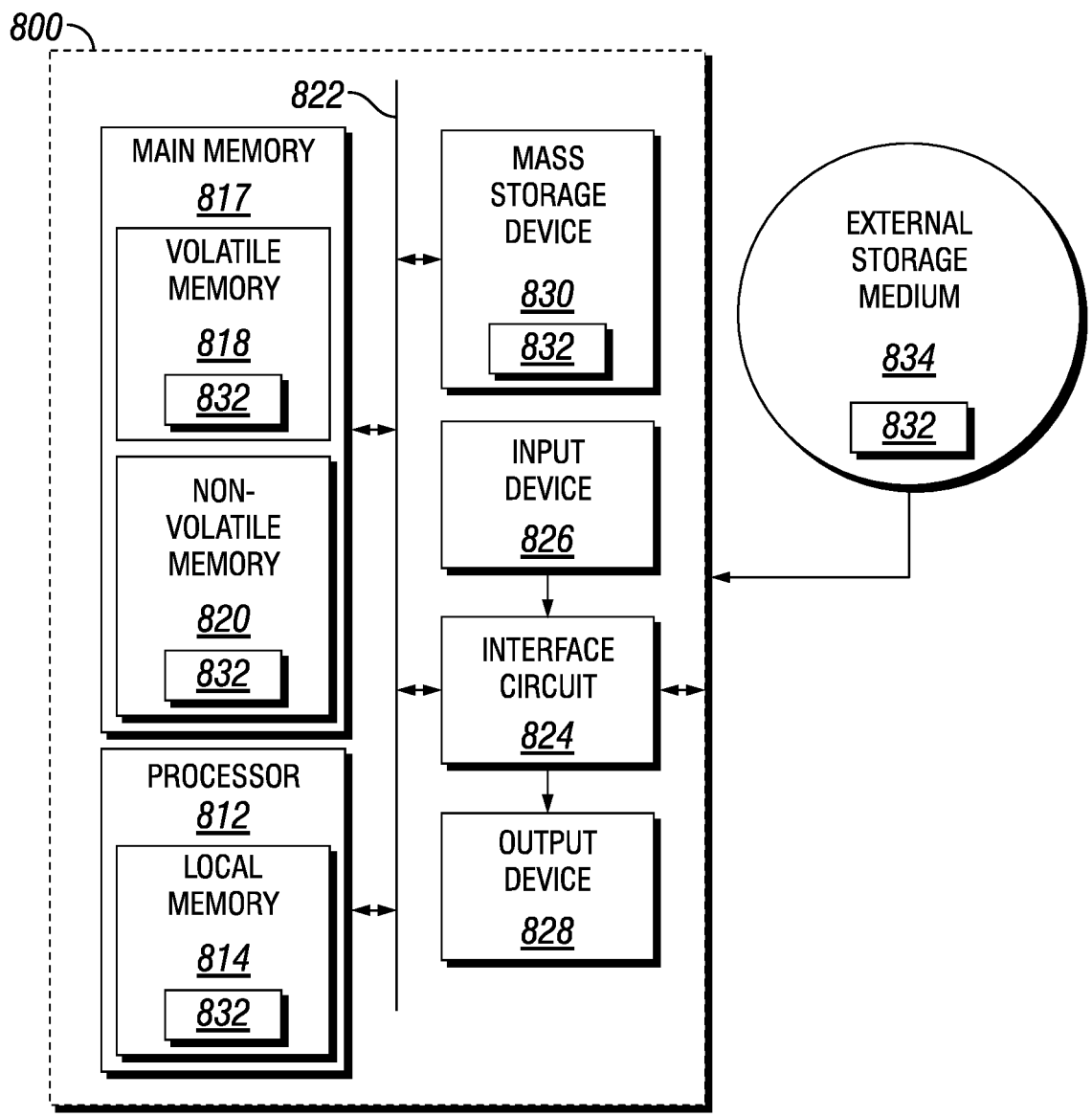
FIG. 10 is a schematic view of at least a portion of apparatus according to one or more aspects of the present disclosure.

FIG. 10 is a schematic view of at least a portion of an example implementation of a processing system 800 according to one or more aspects of the present disclosure. The processing system 800 may execute example machine-readable instructions to implement at least a portion of one or more of the methods and/or processes described herein, and/or to implement a portion of one or more of the example downhole tools described herein. The processing system 800 may be or comprise, for example, one or more processors, controllers, special-purpose computing devices, servers, personal computers, personal digital assistant (PDA) devices, smartphones, internet appliances, and/or other types of computing devices.

The processing system 800 may comprise a processor 812, such as a general-purpose programmable processor, for example. The processor 812 may comprise a local memory 814, and may execute program code instructions 832 present in the local memory 814 and/or another memory device. The processor 812 may execute, among other things, machine-readable instructions or programs to implement the methods and/or processes described herein. The programs stored in the local memory 814 may include program instructions or computer program code that, when executed by an associated processor, cause a controller and/or control system implemented in surface equipment and/or a downhole tool to perform tasks as described herein. The processor 812 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 812 may be in communication with a main memory 817, such as via a bus 822 and/or other communication means. The main memory 817 may comprise a volatile memory 818 and a non-volatile memory 820. The volatile memory 818 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 820 may be, comprise, or be implemented by read-only memory, flash memory, and/or other types of memory devices. One or more memory controllers (not shown) may control access to the volatile memory 818 and/or the non-volatile memory 820.

The processing system 800 may also comprise an interface circuit 824. The interface circuit 824 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 824 may also comprise a graphics driver card. The interface circuit 824 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 826 may be connected to the interface circuit 824. One or more of the input devices 826 may permit a user to enter data and/or commands for utilization by the processor 812. Each input device 826 may be, comprise, or be implemented by a keyboard, a mouse, a touchscreen, a track-pad, a trackball, an image/code scanner, and/or a voice recognition system, among other examples.

One or more output devices 828 may also be connected to the interface circuit 824. One or more of the output devices 828 may be, comprise, or be implemented by a display device, such as a liquid crystal display (LCD), a light-emitting diode (LED) display, and/or a cathode ray tube (CRT) display, among other examples. One or more of the output devices 828 may also or instead be, comprise, or be implemented by a printer, speaker, and/or other examples.

The processing system 800 may also comprise a mass storage device 830 for storing machine-readable instructions and data. The mass storage device 830 may be connected to the interface circuit 824, such as via the bus 822. The mass storage device 830 may be or comprise a floppy disk drive, a hard disk drive, a compact disk (CD) drive, and/or digital versatile disk (DVD) drive, among other examples. The program code instructions 832 may be stored in the mass storage device 830, the volatile memory 818, the non-volatile memory 820, the local memory 814, and/or on a removable storage medium 834, such as a CD or DVD.

The mass storage device 830, the volatile memory 818, the non-volatile memory 820, the local memory 814, and/or the removable storage medium 834 may each be a tangible, non-transitory storage medium. The modules and/or other components of the processing system 800 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

Figure 11:
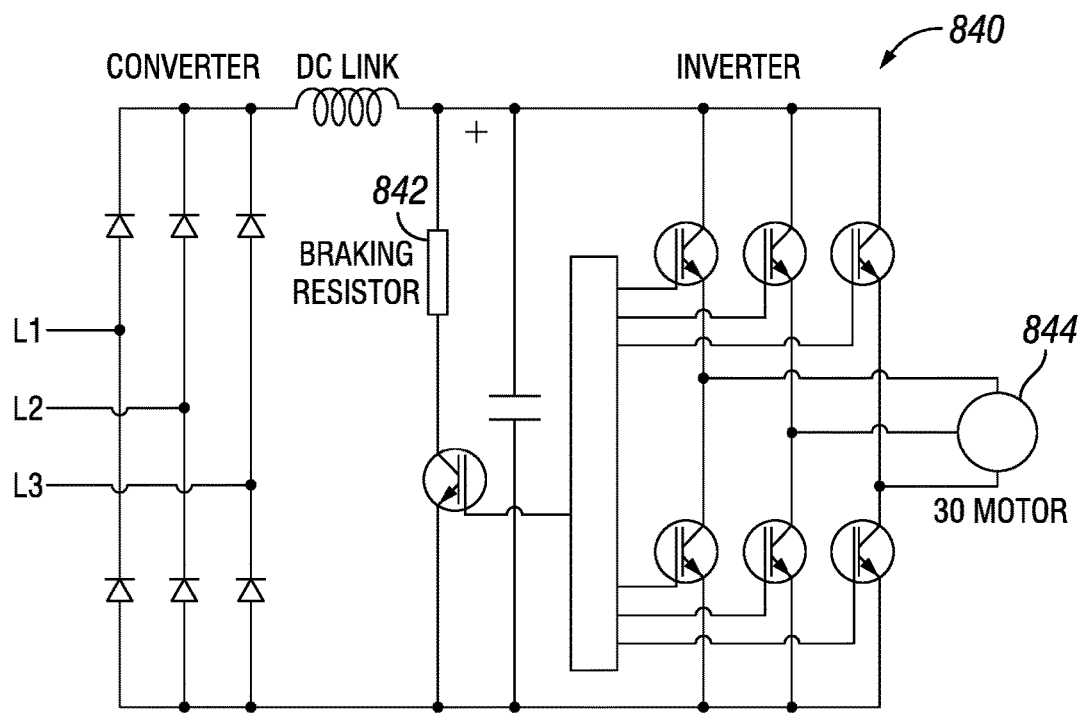
FIG. 11 is a schematic view of at least a portion of apparatus according to one or more aspects of the present disclosure.

Referring to FIG. 11, in some applications, the DC bus of the VFD inverter may be connected to a chopper 840 to allow braking effect of the electrical motor 844. When the induction motor is acting as a generator while the inverter is driven at proper AC frequency, the diodes associated with the MGT may act as a rectifier: AC voltage generated by the induction machine is rectified and may raise the DC voltage. The chopper 840 may evacuate some of this DC power into a brake resistor 842. Such resistor braking effect may also be managed by the IPEU. The resistor is installed outside the IPEU, because a fair amount of heat may be generated during motor brake action. The brake energy may be limited (e.g., associated with triplex pump). In such case, the resistor 842 may be mounted outside the IPEU and a limited power fan may be included to limit the temperature increase during braking. In some applications, major brake action may be required. This is the case when the IPEU box is controlling a rig drawworks. In such case, the drawworks motor may deliver its full power during 30 seconds. This would represent an energy in the range of 60 Mjoules (2 Mwatt for 30 sec). This would increase the temperature of one ton of water by 15 Degrees Celsius.

Figure 12:
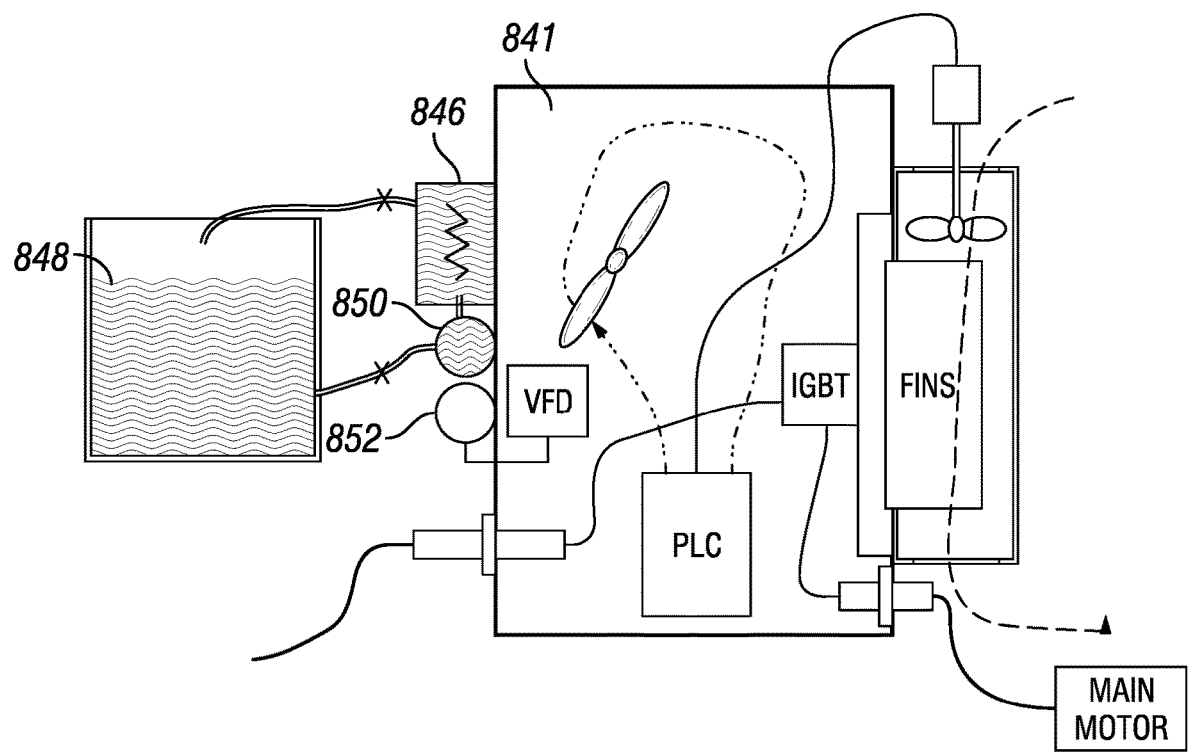
FIG. 12 is a schematic view of at least a portion of apparatus according to one or more aspects of the present disclosure.

In such case, as shown in FIG. 12, the IPEU 841 may include a water-submerged resistor 846. The water 848 may be circulated by a small pump 850 driven by a motor 852 associated with a VFD of the IPEU 841. The water 848 may be circulated with a reservoir of one ton (1 M3) of water, allowing three long brake actions at full load. The chopper 840 may also be connected to an energy recovery system to recover electrical energy during brake periods.

Figure 13:
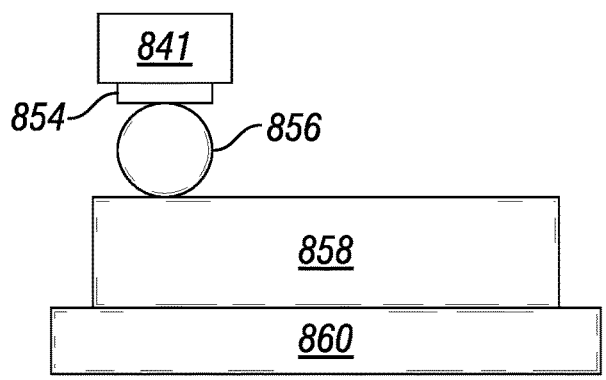
FIG. 13 is a schematic view of at least a portion of apparatus according to one or more aspects of the present disclosure.
Figure 14:
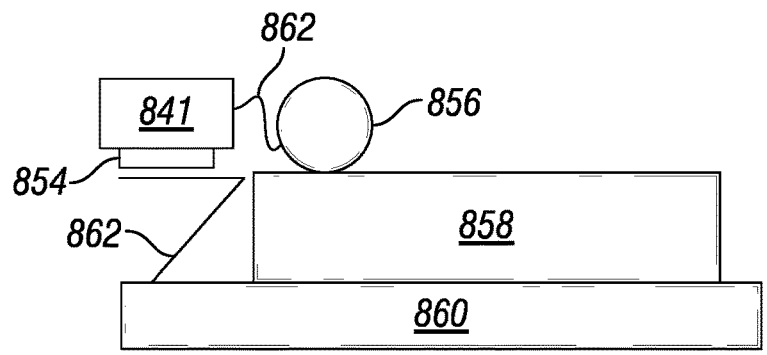
FIG. 14 is a schematic view of at least a portion of apparatus according to one or more aspects of the present disclosure.
Figure 15:
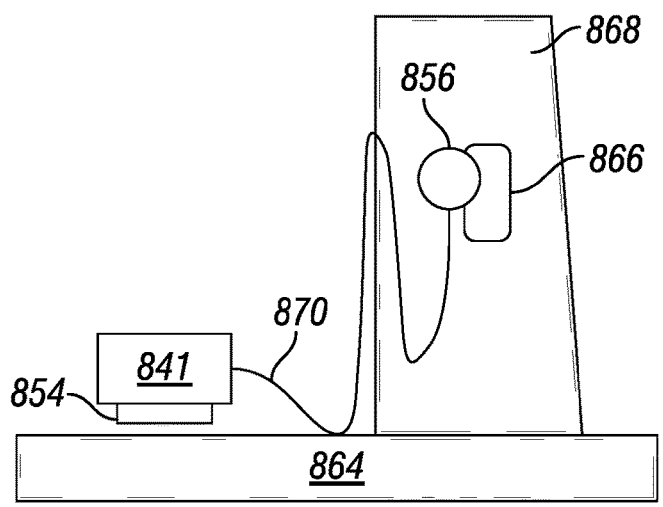
FIG. 15 is a schematic view of at least a portion of apparatus according to one or more aspects of the present disclosure.

The IPEU 841 may be water tight, perhaps to reach IP54. It may be designed to operate in zone 2. The safety requirement of zone 2 may be provided by one of the following systems, as shown in FIGS. 13-15. FIG. 13 shows an embodiment including a IPEU 841, a deformable attachment 854 beneath and supporting the IPEU 841, a motor 856 underneath the attachment 854, and a rig machine 858 which can be a triplex or a mud pump or any other suitable machine. The rig machine 858 can be placed onto a skid 860.

FIG. 14 is another illustration of an arrangement of components according to embodiments of the present disclosure. The machine skid 860 supports the rig machine 858 which in turn supports the motor 856. A support 862 is separately located on the skid 860 and is mounted with a deformable attachment 854 which supports the IPEU 841. The IPEU 841 can be connected to the motor 856 via a cable 862 The deformable attachment can be a vibration insulator, a damper, a shock absorber or another suitable form of protection from vibration and shock from the skid to protect the electrical components in the IPEU 841.

FIG. 15 shows yet another embodiment according to the present disclosure. In some cases, the IPEU 841 may be used for top drive. In such case, the IPEU may be on the rig floor or in the mast. The configuration shown includes a rig floor 864, a deformable attachment 854 on the rig floor 864 which supports the IPEU 841. IPEU 841 is connected to a service loop 870. There is also a mast 868 which stands apart from the IPEU 841 which supports a top drive 866, and a motor 856. The service loop 870 provides sufficient communication and fluid transport between IPEU 841 and motor to achieve the ends described herein.

Power is fed power to the IPEU by cable(s). When multiple IPEUs are mounted on one large skid, they may be connected in daisy chain or other connection schemes. The control of the IPEU may be obtained via a control cable (hybrid cable for command and Emergency stop) or wireless. If wireless, special wireless communication may be provided to perform the function of emergency stop.

The IPEU may be mounted next to the motor that it operates. In many applications (mud pumps, drawworks, etc.), the IPEU may be mounted on the machine skid or even directly on the motor. In such cases, the cable between the VFD and the motor may be very short. It may be internal to the mounting system or inside a conduit between the IPEU and the motor. With such cabling, electrical resonance may be minimized.

The IPEU may be mounted on the associated machine via shock absorber. This may reduce the vibration in IPEU, and may reduce the risk of excitation of resonance, which may damage some electronic components. In some applications, the main resonance frequency may be affected by adjusting the spring coefficient of the support. In other applications, the dampening may be affected to reduce the Q-factor of some mechanical resonance.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The invention claimed is:

1. An integrated power and electronics unit (IPEU), comprising:
    a housing having a power input configured to receive input power from a generator, the housing having a plurality of outputs;
    a programmable logic controller (PLC) within the housing configured to communicate with an external module and to thereby receive control instructions;
    a rectifier within the housing configured to receive power from the generator via the power input;
    a transformer within the housing configured to receive and transform the power;
    a plurality of starters within the housing being configured to receive power from the transformer, the starters being configured to provide power to individual auxiliary units;
    a plurality of inverters within the housing being configured to receive power from the rectifier, each inverter being coupled to a rig machine to deliver power and control to the rig machines via the outputs.

2. The IPEU of claim 1 further comprising a cooling system mounted to the housing and configured to dissipate heat from the housing, the cooling system being configured to receive power and controls from one or more of the inverters.

3. The IPEU of claim 2 wherein the cooling system comprises a liquid cooling system including at least one fan and at least one pump, wherein the fan and pump are configured to receive power and controls from one or more of the inverters.

4. The IPEU of claim 1 wherein the rig machines comprise at least one of a triplex, a mud pump, or a drawworks.

5. The IPEU of claim 1, further comprising a plurality of sensors operably coupled to the rig machine to collect data pertaining to a characteristic of the rig machine, the sensors being coupled to the PLC.

6. The IPEU of claim 1, further comprising a skid configured to support the IPEU, wherein the skid is coupled to a drilling rig.

7. The IPEU of claim 1, further comprising a vibration isolating support configured to support the IPEU and insulate the IPEU from vibration.

8. The IPEU of claim 1 wherein at least one of the inverters is configured to be coupled to a main motor of a drilling rig.

9. The IPEU of claim 1 wherein at least one of the inverters is configured to be coupled to fans and pumps for use on a drilling rig.

10. The IPEU of claim 1 wherein the plurality of inventors are coupled to at least a first rig machine and a second rig machine, wherein the first rig machine is a master and the second rig machine is a slave, wherein the master rig machine is configured to sync with a remote computing device, and wherein the slave rig machine is configured to sync locally with the master rig machine.

11. The IPEU of claim 1 wherein the rig machine is coupled to a skid, and wherein the IPEU is supported by the rig machine with a vibration isolation component between the IPEU and the rig machine to isolate the IPEU from vibrations from the rig machine.

12. The IPEU of claim 1 wherein the IPEU is mounted to a drilling rig via a vibration isolation component, the IPEU is coupled to the rig machine via cables and fluid ports, and wherein the rig machine is separately coupled to the drilling rig.

13. The IPEU of claim 1 wherein the IPEU is configured to transmit at least 15,000 Watts of electric power.

14. The IPEU of claim 1 wherein the IPEU is configured to transmit at least 20,000 Watts of electric power.

15. An integrated power and controls unit (IPEU), comprising:
   an input power module configured to receive power from a generator;
   a rectifier configured to receive power via the input power module;
   a plurality of inverters operably coupled to the rectifier and configured to receive power from the rectifier, wherein each inverter is configured to convey power to a rig machine, the rig machine being coupled to the IPEU;
   a transformer configured to receive power via the input power module;
   a plurality of starters operably coupled to the transformer and configured to receive power from the transformer, wherein the starters are configured to convey power to one or more auxiliary devices;
   a controller operably coupled to the rectifier, the inverters, the transformer, and the starters, wherein the controller is configured to receive instructions from a remote device by which to control the rectifier, the inverters, the transformer, and the starters;
   a housing covering the rectifier, the inverters, the transformer, and the starters integrated together in the housing; and
   a cooling system coupled to the housing and configured to dissipate heat from the housing.

16. The IPEU of claim 15 wherein the IPEU is configured to transmit at least 15,000 Watts.

17. The IPEU of claim 15 wherein the IPEU is configured to transmit at least 20,000 Watts.

18. The IPEU of claim 15 wherein the controller is further coupled to at least one of the cooling system, the rig machine, and the auxiliary devices.

19. The IPEU of claim 15 wherein the cooling system is a liquid cooling system.

20. The IPEU of claim 15 wherein one of the inverters is larger than the other inverters and wherein the inverter is coupled to a main motor of a drilling rig.

21. The IPEU of claim 15 wherein the rig machine comprises one or more of a drawworks, a mud pump, a centrifugal pump, and a top drive.

22. The IPEU of claim 15, further comprising a plurality of sensors coupled to the controller, wherein the controller is configured to operate at least one of the rig machine or the auxiliary devices based at least in part upon data received from the sensors.

23. The IPEU of claim 15, further comprising a vibration isolation component configured to support the IPEU and isolate the IPEU from vibration and shock.

24. The IPEU of claim 23, further comprising a skid upon which the vibration isolation component is situated.

25. A method, comprising:
   providing a housing configured to integrally house a controller, a rectifier, a transformer, a plurality of inverters, and a plurality of starters, the inverters being configured to transmit power and control to one or more rig machines, the starters being configured to start a plurality of auxiliary devices;
   communicating with the controller to operate the rectifier, transformer, inverters, and starters; and
   operating the rig machines and the auxiliary devices via the controller.

26. The method of claim 25, further comprising receiving data from a plurality of sensors and transmitting the data to the controller.

27. The method of claim 25, further comprising providing a cooling system configured to dissipate heat from the housing.

28. The method of claim 25 wherein the rectifier, transformer, and inverters are configured to transmit at least 15,000 Watts of electric power.

29. The method of claim 25, wherein the rig machine comprises at least one of a mud pump, a drawworks, a top drive, and a centrifugal pump.

* * * * *